United States Patent [19]

Hashimoto

[11] Patent Number: 4,497,839

[45] Date of Patent: Feb. 5, 1985

[54] METHOD OF PROCESSING UNMILLED RICE WITH CHAFFS ATTACHED THERETO

[76] Inventor: Motoichi Hashimoto, Nota Mansion 304, 2-49 Haramachi, Shinjuku-ku, Tokyo, Japan

[21] Appl. No.: 545,652

[22] Filed: Oct. 26, 1983

[30] Foreign Application Priority Data

Nov. 2, 1982 [JP] Japan ................................. 57-191924

[51] Int. Cl.$^3$ ........................... A23L 1/10; A23P 1/00
[52] U.S. Cl. .................................... 426/482; 426/483; 426/507; 426/511; 426/618
[58] Field of Search ............... 426/482, 483, 481, 507, 426/508, 510, 511, 618

[56] References Cited

U.S. PATENT DOCUMENTS 2,525,137 10/1950 Jones et al. ......................... 426/507
3,421,902 1/1969 Wayne ................................ 426/482

Primary Examiner—George Yeung
Attorney, Agent, or Firm—Thomas H. Whaley

[57] ABSTRACT

The invention is relative to a method of processing unmilled unsprouted rice with chaffs according to which the rice is immersed in water for a predetermined time, the rice is then freed of water affixed thereto and roasted in a kiln for a predetermined time at a predetermined temperature, the rice thus roasted is steamed, pressured by rolls and freed of peeled-off chaffs, and the processed rice obtained by the method.

7 Claims, No Drawings

METHOD OF PROCESSING UNMILLED RICE WITH CHAFFS ATTACHED THERETO

FIELD OF THE INVENTION

This invention relates to processed food prepared from unmilled rice with chaff attached thereto. More particularly, it relates to a method of processing unmilled rice with chaff about to be sprouted and the processed rice obtained by the method that may be served to the aged, infants and invalids and stored for long periods of time for emergency use, such as after an earthquake or typhoon.

BACKGROUND OF THE INVENTION

Unmilled rice, while appraised highly because of its excellent nutritive value, is not necessarily welcomed by the consuming public because of processing and storage difficulties.

In light of this, research has been done on effective processing of the unmilled rice. For example, the Japanese Laid-open Patent Publication No. 48357/1980 discloses a method for producing keepable food from unmilled rice, according to which unmatured rice with chaffs swollen with water is dehydrated, then fried in a rotary kiln at a temperature at which the rice chaff is burst open, and pressured between a pair of rolls, while the peeled-off chaffs are removed. On the other hand, the Japanese Laid-Open Patent Publication No. 118361/1980 discloses a method of producing precooked food according to which unmilled rice swollen with water is alpharized by roasting and the peeled-off chaffs are removed.

In the former method, since the chaffs are removed at an earlier processing step, the layer of rice bran containing rice germ, rice germ milk or fat, protein, inorganic matter and vitamins tends to be discarded. Thus it is not possible to completely hold the nutrients of the unmilled rice in the processed food.

In the latter method, the rice is fried and hence can be preserved for a certain time. However, the processed rice needs to be cooked again before service because it is relatively hard and therefore is not necessarily suited as emergency food.

While there are other types of the precooked keepable rice food, these are not generally preferred because they contain chemicals and food additives if they are to be preserved for prolonged time.

These types of processed rice food are not entirely satisfactory because some do not come up to the taste of many, while others are unsuitable for prolonged storage, elevated in costs because of chemicals or food additives, or lack mineral nutrients.

BRIEF DESCRIPTION OF THE INVENTION

This invention has been completed in view of the aforementioned deficiency of the prior art and with a view to providing emergency food or staple food for the aged, invalids or infants. It comprises a method of processing rice, i.e. brown rice with chaffs and unmilled rice according to which unmilled rice with chaffs about to be sprouted is immersed in water for a predetermined time, freed of water attached thereto, roasted in a kiln for a predetermined time and at a predetermined temperature, steamed and aged, pressured by rolls and then freed of peeled-off chaffs. The invention also includes the processed rice food obtained by the method.

DETAILED DESCRIPTION OF THE INVENTION

The term "unmilled rice with chaffs" is used herein to denote rice as cropped and threshed, that is, cropped rice from which ears have been removed.

In the method of the present invention, unmilled rice with chaffs which is about to be sprouted, is used as starting material. The rice grains at this stage have the greatest nutrient value because of the continued supply of the nutrients from the rice plants to the grains until the time of cropping.

The unmilled rice with chaffs at this stage consists roughly of rice hull, germ and germ milk, the germ containing vitamins, protein, fats and minerals and the germ milk containing starch.

These nutrients in the germ tend to peel off upon removal of the chaffs on account of physical stress caused during threshing and subsequent contact of rice grains with one another. For instance, fat contents in unmilled rice with chaffs may fall to 1.7 percent from 3 percent for unmilled rice with chaffs.

The nutrients (g/100 g) contained in unmilled rice per se and those in polished rice obtained upon milling are shown in the Table below.

|  | Protein | Fat | Glucide | Vitamin $B_1$ |
| --- | --- | --- | --- | --- |
| Unmilled Rice | 7.4 | 3.0 | 71.8 | 0.54 |
| Polished Rice | 6.8 | 1.3 | 75.5 | 0.12 |

It is therefore apparent that the chaffs are preferably removed at the latest possible stage of processing of unmilled rice.

In view of the foregoing, unmilled rice with chaffs is immersed in water for e.g. 24 to 72 hours as a preliminary step, after which the rice is dehydrated for 12 to 24 hours and transferred to a kiln for roasting. It is preferred that water contents of approximately 25 to 40 percent in unmilled rice with chaffs be adjusted to 13 to 18 percent by the roasting process, because the rice may otherwise be collapsed in shape in the subsequent processing.

Roasting is continued for 15 to 20 minutes at a temperature of approximately 100° to 140° C. The purpose of this roasting step is to get about one half (about 30 to 50 percent) of unmilled rice starch alpharized and to promote transmutation of the rice hull for steam to be absorbed more easily into rice grains.

The unmilled rice with chaffs thus roasted is steamed and flattened in shape by pressuring between a roll pair made of steel. This pressuring is carried out under heat. If unmilled rice without chaffs were subjected to such pressuring, mineral contents in unmilled rice would be lost.

The rice is flattened to minimize cooking, and to promote digestion. The processed rice may be supplied in any desired thickness according to its intended use.

After pressuring, the chaffs are ultimately removed from the rice. The chaffs may be removed easily because they are already split in the preceding pressuring step and the water contents in the chaffs are lowered (about 12 to 15 percent). For instance, unmilled rice with chaffs is dropped into air from a supply chute and separated from the chaffs under the effect of an air current. Alternatively, any suitable device may be used for separating the chaffs from the unmilled rice and automatically transferring only the rice into a storage tank.

The unmilled rice thus processed in accordance with the present invention may be adapted as food for the aged, invalids or infants, emergency food of cooking material as for instance in adjusting the density of consomé soup or as relish or seasoning for meat dish.

For better understanding of the present invention, reference is now made to a preferred embodiment of the invention which is intended for illustration only and is not intended for limiting the scope of the invention.

EXAMPLE

Fresh unmilled rice with chaffs attached thereto was immersed for 36 hours in water maintained at room temperature (20° to 25° C.). This rice was dried in shade as it was dehydrated gradually for 12 hours. About 30 kgs of this starting rice thus swollen with water were then taken in a kiln-type roaster a little less than 1 m in diameter and about 1 m in length and roasted. The roasted rice thus obtained was aged in the tower for 20 minutes at 100° to 120° C. by high-pressure steam supplied from a lower steam inlet of the tower. The rice thus aged was taken out gradually from the lower part of the tower and supplied to a pair of rolls (each 30 cm in diameter and 120 cm in length) for pressuring.

The temperatures to which the rice was subjected during roasting are shown below. The ultimate water contents of the rice were in the range of from 13 to 18 percent.

|  |  | initial | 150 to 170° C. |
|---|---|---|---|
| after | 2 | minutes | 100 to 120° C. |
| after | 3 | minutes | 90 to 120° C. |
| after | 7 | minutes | " |
| after | 10 | minutes | " |
| after | 15 | minutes | " |
| after | 20 | minutes | " |

After pressuring, it was found that chaffs were peeled off from the rice grains almost completely. Thus, these chaffs were blown off and removed upon operation of a fan and the rice was allowed to descend in a collecting zone.

Upon analysis, the rice was found to have the following characteristics,

|  | Inventive | cooked unmilled rice | cooked well milled rice |
|---|---|---|---|
| moisture % (atmospheric desiccation) | 15.4 | 63.0 | 65.0 |
| protein (factor, 5.95) % | 6.6 | 3.3 | 2.6 |
| lipid (acidolysis) % | 1.6 | 1.3 | 0.5 |
| glucide % | 75.3 | 31.4 | 31.7 |
| fiber % | 0.3 | 0.4 | 0.1 |
| ash % | 0.8 | 0.6 | 0.1 |
| energy per 100 g* | 339$^{Kcal}$ | 153$^{Kcal}$ | 148$^{Kcal}$ |
| phosphorous,** mg | 178 | 130 | 30 |
| calcium**, mg | 10.2 | 4 | 2 |
| iron**, mg | 3.96 | 0.5 | 0.1 |
| natrium**, mg | 2.11 | 2 | 2 |
| vitamin $B_1$** | 0.18 | 0.16 | 0.03 |
| vitamin $B_2$** | 0.01 | 0.02 | 0.01 |
| α - degree % | 98.6 | — | — |

*The factors of 3.41, 5.39 and 4.07 were used for protein, lipid and carbohydrate (glucide plus fiber), respectively.
**mg/100 g It is seen from above that the unmilled rice processed in accordance with the present invention (with α-degree nearly equal to 100 percent) can be stored for prolonged time and thus used conveniently as kept or portable food. Moreover, as shown in the Example above, the glucide contents in the hull are retained in the processed rice because the unmilled rice with chaffs is pressured by rolls so that the high nutritive value is retained in the rice.

In using the inventive rice as food, a small amount of water is added to the rice. If desired, the rice may be heated with water to a rice gruel. When used as emergency food, the rice gruel may be completed in several minutes upon pouring a suitable amount of hot water to the rice. Thus the processed rice of the present invention is extremely useful as instant food in hospitals or asylum for aged for improving the diet of the aged or patients.

I claim:

1. A method of processing unmilled rice and rice with chaffs attached thereto to produce a rice product having high nutritive value comprising immersing the unmilled rice with chaffs about to be sprouted in water for a predetermined time; freeing the rice of water affixed thereto; roasting the rice in a kiln to a moisture content of 13 to 18 weight percent at a temperature in the range of 90° to 170° C.; thereafter steaming the rice for a period of time of about 20 minutes at a temperature in the range of 100° to 120° C.; pressuring the steamed rice by rolls, and freeing the rolled rice of peeled-off chaffs.

2. A process according to claim 1 wherein said roasting is carried out at a temperature in the range of 90° to 140° C.

3. A process according to claim 1 wherein the unmilled rice is roasted at a temperature in the range of 100° to 140° C. for a time period within the range of 15 to 20 minutes.

4. A process according to claim 1 wherein unmilled rice is soaked in water at room temperature for a period of time within the range of 24 to 72 hours prior to freeing the water affixed thereto.

5. A process according to claim 1 wherein the resulting rice after the water freeing step has a moisture content in the range of 25 to 40 weight percent prior to roasting.

6. A process according to claim 5 wherein said water freeing step is carried out in air at ambient temperature.

7. A rice product produced in accordance with the method defined in claim 1.

* * * * *